(12) United States Patent
David

(10) Patent No.: US 8,645,518 B2
(45) Date of Patent: *Feb. 4, 2014

(54) COMPUTER-IMPLEMENTED METHOD FOR COMPENSATING ANCILLARY USE OF A REMOTELY ACCESSIBLE NETWORK DEVICE

(76) Inventor: Scott L. David, Bainbridge Island, WA (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/245,775

(22) Filed: Sep. 26, 2011

(65) Prior Publication Data

US 2012/0014290 A1 Jan. 19, 2012

Related U.S. Application Data

(63) Continuation of application No. 12/749,457, filed on Mar. 29, 2010, now Pat. No. 8,028,057, which is a continuation of application No. 11/058,340, filed on Feb. 14, 2005, now Pat. No. 7,689,681.

(51) Int. Cl.
*G06F 15/173* (2006.01)
*H04L 12/28* (2006.01)

(52) U.S. Cl.
USPC .......................................... 709/223; 370/254

(58) Field of Classification Search
USPC .................................. 709/223; 370/255, 254
See application file for complete search history.

(56) References Cited

U.S. PATENT DOCUMENTS

| 5,193,056 | A | 3/1993 | Boes |
| 7,398,318 | B2 * | 7/2008 | McIntyre ...................... 709/229 |
| 8,028,057 | B2 * | 9/2011 | David ........................... 709/223 |

OTHER PUBLICATIONS

A. Ananthaswamy, "Spontaneous Networks Will Speed Net Access," NewScientist, Feb. 14, 2004, pp. 22-23 (2004).

* cited by examiner

*Primary Examiner* — Backhean Tiv
*Assistant Examiner* — Alan S Chou
(74) *Attorney, Agent, or Firm* — Patrick J. S. Inouye; Makiko Coffland

(57) ABSTRACT

A computer-implemented method for compensating ancillary use of a wireless service device for excess transmission bandwidth is provided. Wireless service devices are discovered. Each wireless service device is interoperable on a wireless service network operated by a service provider. For each wireless service device, a primary function performable by a subscriber through the wireless service network and an ancillary function performable by a third party through the wireless service network based on availability of capacity for excess transmission bandwidth are determined. The wireless service devices include an available capacity to perform the ancillary function over the service network is identified. The ancillary function is performed over the excess transmission bandwidth using the identified wireless service devices through combination, modification and integration of data from the two or more other such identified wireless service devices. Participants of the ancillary function in exchange for the performance of the ancillary function are compensated.

27 Claims, 6 Drawing Sheets

COMPUTER-IMPLEMENTED METHOD FOR COMPENSATING ANCILLARY USE OF A REMOTELY ACCESSIBLE NETWORK DEVICE

CROSS-REFERENCE TO RELATED APPLICATION

This patent application is a continuation of U.S. patent application Ser. No. 12/749,457, filed Mar. 29, 2010, now U.S. Pat. No. 8,028,057; which is a continuation of U.S. application Ser. No. 11/058,340 filed Feb. 14, 2005 now U.S. Pat. No. 7,689,681, issued Mar. 30, 2010, the priority filing dates of which are claimed and the disclosures of which are incorporated by reference.

FIELD

The invention relates in general to remotely accessible network device control and, in particular, to a system and method for compensating ancillary use of a remotely accessible network device.

BACKGROUND

Remotely accessible network devices, particularly wireless devices, provide user friendly and highly affordable convenience to consumers and businesses. Popular wireless devices include wireless-enabled computers, Internet access and personal data assistants, Global Positioning System (GPS) receivers, automobile, personal and boat navigation systems, pagers and text messaging devices, radio frequency identification (RFID) tags, devices that permit users to access e-mail, and cellular telephones. Conventionally, each of these devices provides remote access into and interaction with networked and interconnected resources, whether for voice, data or other forms of digital and electronic information exchange.

Frequently, private data network access is provided as part of a computing infrastructure within a home or business between employees, customers and other permitted users, such as provided by IEEE 802.11-compliant Wireless Fidelity (WiFi) and IEEE 802.16-compliant "WiMAX" networks. However, within the public domain, data and non-data network access is generally provided under a service contract offered by a network service provider. For example, under a typical cellular telephone service arrangement, a subscriber pays a cellular service provider for air time, which is typically offered either at a flat rate with a fixed number of service hours per month or at a per use rate based on actual service utilization. At a minimum, the subscriber receives voice service within a local calling area and can optionally add long distance, international, or digital data calling or a variety of other features.

Such networked communication and computing devices often experience significant periods of non-use or idle time. These devices include the networked communication and computing devices, and other types of sensors and input devices, computing devices, data processing devices, and output devices that are either located remotely or arranged in distributed fashion. Historically, each new generation of network device has offered increasingly powerful, flexible and expandable capabilities. For example, third generation, so-called "3G," cellular telephones offer variable bandwidth capacity and a programming interface. Despite these advances, existing service network access arrangements nevertheless contemplate service provision being offered to subscribers primarily during periods of service consumption. During periods of inactivity, the capabilities of the device often remain available, but are wasted through non-use.

Conventional approaches to performing ancillary functions on devices, such as harnessing excess transmission or processing capacity or propagating a signal, are costly, despite the potential benefits that could be gained by harnessing the excess capacity of existing service networks. Replicating a network with equivalent capabilities as, for instance, the cellular telephone subscriber base in a typical metropolitan region, would require a significant investment in capital, including hardware, physical plant and personnel, plus the on-going costs of maintenance, power and regulatory compliance. The cost-benefit ratio would be particularly unfavorable for networking arrangements requiring "point" readings on an infrequent basis, such as temperature and barometric readings as used in weather reports or other environmental sensing systems.

To exacerbate the problem, private subscribers currently lack an incentive, particularly a financial incentive, to provide remote services, through the excess capacity of their communication and computing devices, to service providers and third parties. Network service arrangements compensate the service providers for the use of or access to, or for a guarantee of availability of, the service network. Additional functionality could be added to privately owned or leased devices, but the cost-benefit ratio would be similarly unfavorable, especially with low-cost devices, such as cellular telephones. Moreover, third parties lack a vehicle to tap into service network subscriber bases as potentially ancillary service providers, such as providing "point" readings through servers installed on user private communication or computing devices.

Therefore, there is a need for an approach to providing a compensation framework to provide an incentive to private end users and network access subscribers to offer the excess functionality of privately-owned or leased devices to the network service providers and third parties. Preferably, such an approach would advantageously harness device idle time, as well as tap functionality provided through add-on components and in content generated by such devices. Such an approach would further accommodate third party indirect beneficiary arrangements transacted through the network service providers.

SUMMARY

One embodiment provides a computer-implemented method for compensating ancillary use of a wireless service device for excess transmission bandwidth. A multiplicity of wireless service devices is discovered. Each wireless service device is interoperable on a wireless service network operated by a service provider. For each wireless service device, a primary function performable by a subscriber through the wireless service network and an ancillary function performable by a third party through the wireless service network based on availability of capacity for excess transmission bandwidth are determined. Each of the wireless service devices including an available capacity to perform the ancillary function over the service network is identified. The ancillary function is performed over the excess transmission bandwidth using at least one of the identified wireless service devices through the combination, modification and integration of data from the two or more other such identified wireless service devices. Participants of the ancillary function in exchange for the performance of the ancillary function are compensated. Benefits inuring to the subscriber are identified and awarded in addition to economic benefit of enhanced network service access. Benefits inuring to the service provider are identified and awarded in addition to economic benefit of increased service volume and bandwidth usage and increased subscriber fees generated by subscriber use of related services. Benefits inuring to the third party are identified and awarded in addition to economic benefit of costs avoided to build out a network of sensors, repeaters or other functionality through the use of existing, in-place devices, which are controlled by the subscribers.

A further embodiment provides compensating ancillary use of a wireless service device for excess processing capacity. A multiplicity of wireless service devices is discovered. Each wireless service device is interoperable on a wireless service network operated by a service provider. For each wireless service device, a primary function performable by a subscriber through the wireless service network and an ancillary function performable by a third party through the wireless service network based on availability of capacity for excess processing capacity are determined. Each of the wireless service devices including an available capacity to perform the ancillary function over the service network is identified. The ancillary function is performed through the excess processing capacity using at least one of the identified wireless service devices through the combination, modification and integration of data from the two or more other such identified wireless service devices. Participants of the ancillary function in exchange for the performance of the ancillary function are compensated. Benefits inuring to the subscriber are identified and awarded in addition to economic benefit of enhanced network service access. Benefits inuring to the service provider are identified and awarded in addition to economic benefit of increased service volume and bandwidth usage and increased subscriber fees generated by subscriber use of related services. Benefits inuring to the third party are identified and awarded in addition to economic benefit of costs avoided to build out a network of sensors, repeaters or other functionality through the use of existing, in-place devices, which are controlled by the subscribers.

A still further embodiment provides computer-implemented method for compensating ancillary use of a wireless service device with add-on functional capacity. A multiplicity of wireless service devices is discovered. Each wireless service device is interoperable on a wireless service network operated by a service provider. For each wireless service device, a primary function performable by a subscriber through the wireless service network and an ancillary function performable by a third party through the wireless service network based on availability of capacity for add-on functional capacity are determined. Each of the wireless service devices including an available capacity to perform the ancillary function over the service network is identified. At least one of the identified wireless service devices is augmented with the add-on functional capacity provided by a source of add-on functional capacity comprising one of an equipment manufacturer and a software developer. The ancillary function is performed through the add-on functional capacity using at least one of the identified wireless service devices through the combination, modification and integration of data from the two or more other such identified wireless service devices. Participants of the ancillary function in exchange for the performance of the ancillary function are compensated. Benefits inuring to the subscriber are identified and awarded in addition to economic benefit of enhanced network service access. Benefits inuring to the service provider are identified and awarded in addition to economic benefit of increased service volume and bandwidth usage and increased subscriber fees generated by subscriber use of related services. Benefits inuring to the third party are identified and awarded in addition to economic benefit of costs avoided to build out a network of sensors, repeaters or other functionality through the use of existing, in-place devices, which are controlled by the subscribers. Benefits inuring to the add-on functional capacity source are identified and awarded in addition to economic benefit from an expanded market for their products and services.

Yet a still further embodiment provides a computer-implemented method for compensating ancillary use of a wireless service device for signal propagation. A multiplicity of wireless service devices is discovered. Each wireless service device is interoperable on a wireless service network operated by a service provider. For each wireless service device, a primary function performable by a subscriber through the wireless service network and an ancillary function performable by a third party through the wireless service network based on availability of capacity for signal propagation are determined. Each of the wireless service devices including an available capacity to perform the ancillary function over the service network is identified. The ancillary function is performed by propagating a signal using at least one of the identified wireless service devices through the combination, modification and integration of data from the two or more other such identified wireless service devices. Participants of the ancillary function in exchange for the performance of the ancillary function are compensated. Benefits inuring to the subscriber are identified and awarded in addition to economic benefit of enhanced network service access. Benefits inuring to the service provider are identified and awarded in addition to economic benefit of increased service volume and bandwidth usage and increased subscriber fees generated by subscriber use of related services. Benefits inuring to the third party are identified and awarded in addition to economic benefit of costs avoided to build out a network of sensors, repeaters or other functionality through the use of existing, in-place devices, which are controlled by the subscribers.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
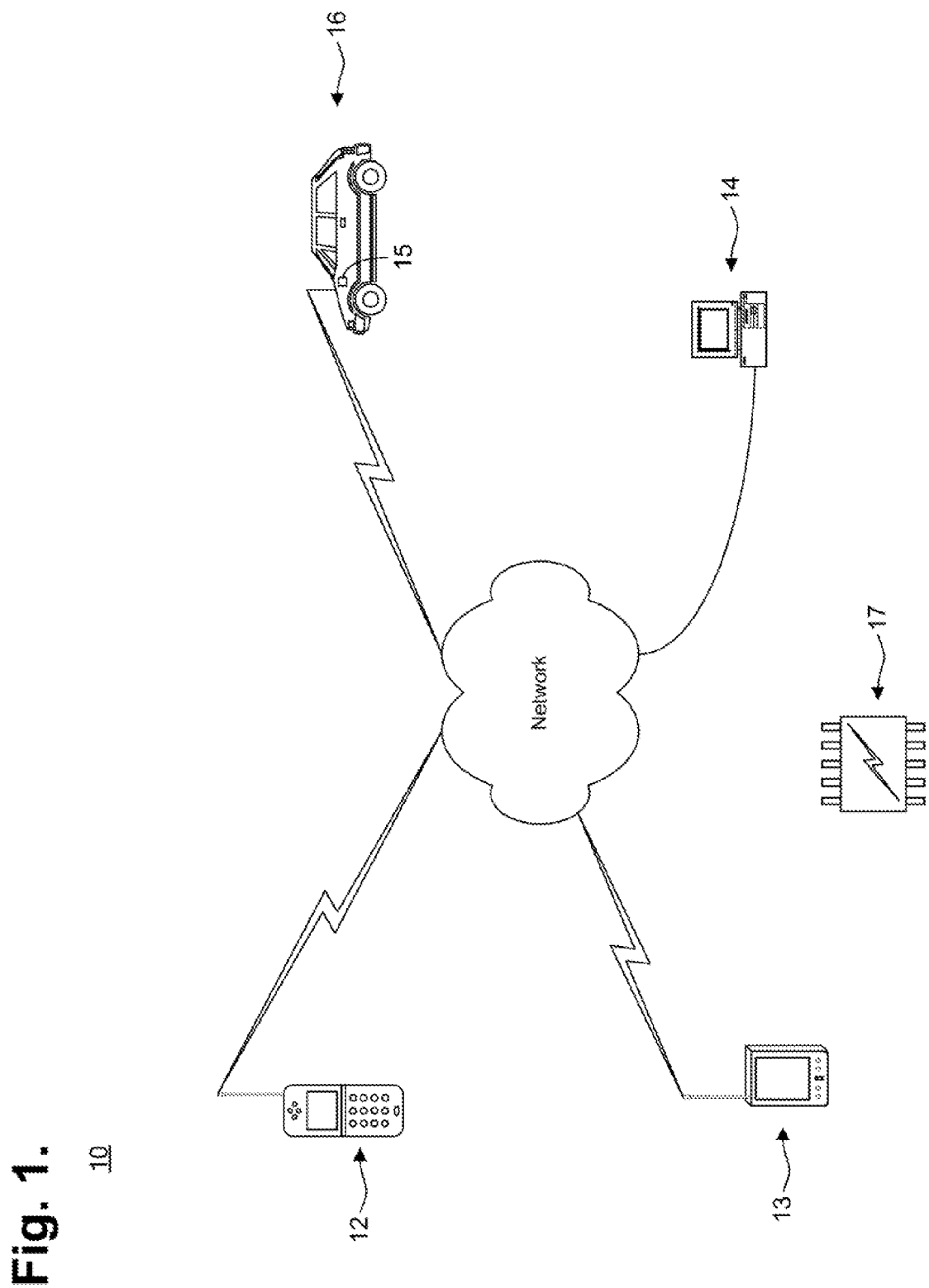
FIG. 1 is a block diagram showing a system for compensating ancillary use of a remotely accessible network device, in accordance with one embodiment.

FIG. 1 is a block diagram showing a system 10 for compensating ancillary use of a remotely accessible network device, in accordance with one embodiment. In one embodiment, network devices, including a cellular telephone 12, wireless-enabled personal data assistant (PDA) 13, wired personal computer 14, and automobile 15 equipped with a wireless-enabled embedded control system 16, interface directly to a service network 11. In a further embodiment, external devices, such as an active radio frequency identification (RFID) tag 17, interface indirectly to the service network 11 through a network device 12-15. Other types of network and external devices, such as Global Positioning System (GPS) receivers, automobile, personal and boat navigation systems, pagers, and text messaging devices, could also be included, as would be appreciated by one skilled in the art.

The service network 11 can provide voice, data and other forms of information exchange. For clarity, only a single service network logically providing each type of service is shown, although multiple physical service networks could be required to support disparate network services for various types of communication and computing devices. For example, voice information exchange can be provided through conventional Plain Old Telephone System (POTS) or cellular service networks including, by way of example, Advanced Mobile Phone Service (AMPS), Global System for Mobile Communications (GSM) and Code-Division Multiple Access (CDMA) networks. Data information exchange can be provided through enterprise, wide area or local area networks including, by way of example, Transmission Control Protocol/Internet Protocol (TCP/IP), IEEE 802.3 (Ethernet), IEEE 802.11 (WiFi), and IEEE 802.16 (WiMAX) networks. The service network 11 can include various topologies, configurations, and arrangements of network interconnectivity components arranged to interoperatively couple and can further include, without limitation, conventionally wired, wireless, satellite, optical, and equivalent network technologies, as would be appreciated by one skilled in the art.

In one embodiment, the devices 12-15 are network capable and perform a primary service function for a user, operator or subscriber (hereafter "subscriber") through an arrangement with a service provider. The primary service function depends upon the type and nature of the network device 12-15 and can exist independently from the service network 11. For example, a cellular telephone 12 can primarily provide voice communication services and can optionally include data and text messaging exchange, as well as stand-alone computing, such as address book or game playing functionality. On the other hand, wireless-enabled PDA 13 and wired personal computer 14 can primarily provide general purpose computing. Such devices can support a network interface for external information exchange and can optionally include voice-over-Internet protocol (VOIP) for voice communications and other services. Moreover, the primary service function need not be coupled to a consumer or user interface. For instance, wireless-enabled embedded control system 16 can provide geolocation coordinates to a 9-1-1 telephone response service through an integrated GPS receiver that is triggered in an emergency and without requiring any user interaction. In a further embodiment, the network devices 12-15 include a capability to interface to an external device 17, such as via infrared, Bluetooth, or radio frequency communications. Other external device interfaces are possible, as would be appreciated by one skilled in the art.

In addition to the primary service function, each of the devices 12-15 is capable of performing one or more ancillary service functions. An ancillary service function is a capability or feature provided by the network device 12-15 in addition or complimentary to the primary service function. In one embodiment, ancillary service functions non-exclusively include:

(1) Excess Transmission: providing receipt of data to or sending of data from the device using excess transmission bandwidth, typically during periods of non-use or inactivity, but possibly simultaneously during periods of use, as further described below with reference to FIG. 2.

(2) Excess Processing: providing data processing on the device using excess processing capacity, typically during periods of non-use or inactivity, but possibly simultaneously during periods of use, as further described below with reference to FIG. 3.

(3) Add-On: providing additional capabilities through add-on functionality or modifications to the device, as further described below with reference to FIG. 4.

(4) Signal Propagation: providing relay of a data signal from the device to another network or external device or from another network or external device to the device using excess transmission bandwidth, typically during periods of non-use or inactivity, but possibly simultaneously during periods of use, as further described below with reference to FIG. 5.

Other ancillary service functions are possible, as would be appreciated by one skilled in the art.

Ancillary service functions are typically performed for a requesting party other than the subscriber, but could also be performed at the initiative of the subscriber. Generally, the requesting party seeks to execute an ancillary service function on one or more devices 12-15 in exchange for compensation, as further described below with reference to FIG. 6. The compensation can include payments, credits, services or components, such as equipment or software, that are provided directly to the subscriber or indirectly through an intermediary, either in kind or by equivalent. For example, a third party may provide payments to a service provider that in turn issues credits to a subscriber in exchange for use of the ancillary function by the third party.

Requesting parties include, by way of example, the subscriber, service providers, equipment manufacturers, software developers, other device users, data collectors, and third parties. Service providers include network service providers that offer the actual underlying network service, such as cellular telephone or wireless network service, as well as service-over-network or product-over-network providers, such as on-line music download stores and on-line retailers. Other requesting parties are possible, as would be appreciated by one skilled in the art. Only the requesting party and the subscriber must agree to and participate in the ancillary service provisioning. Intermediaries, such as the service provider, need not be aware of the ancillary service provisioning. For example, a third party may request ancillary services from a subscriber, which is provided directly to the third party without any involvement with the service provider.

Service Provision Through Excess Transmission Capacity

Figure 2:
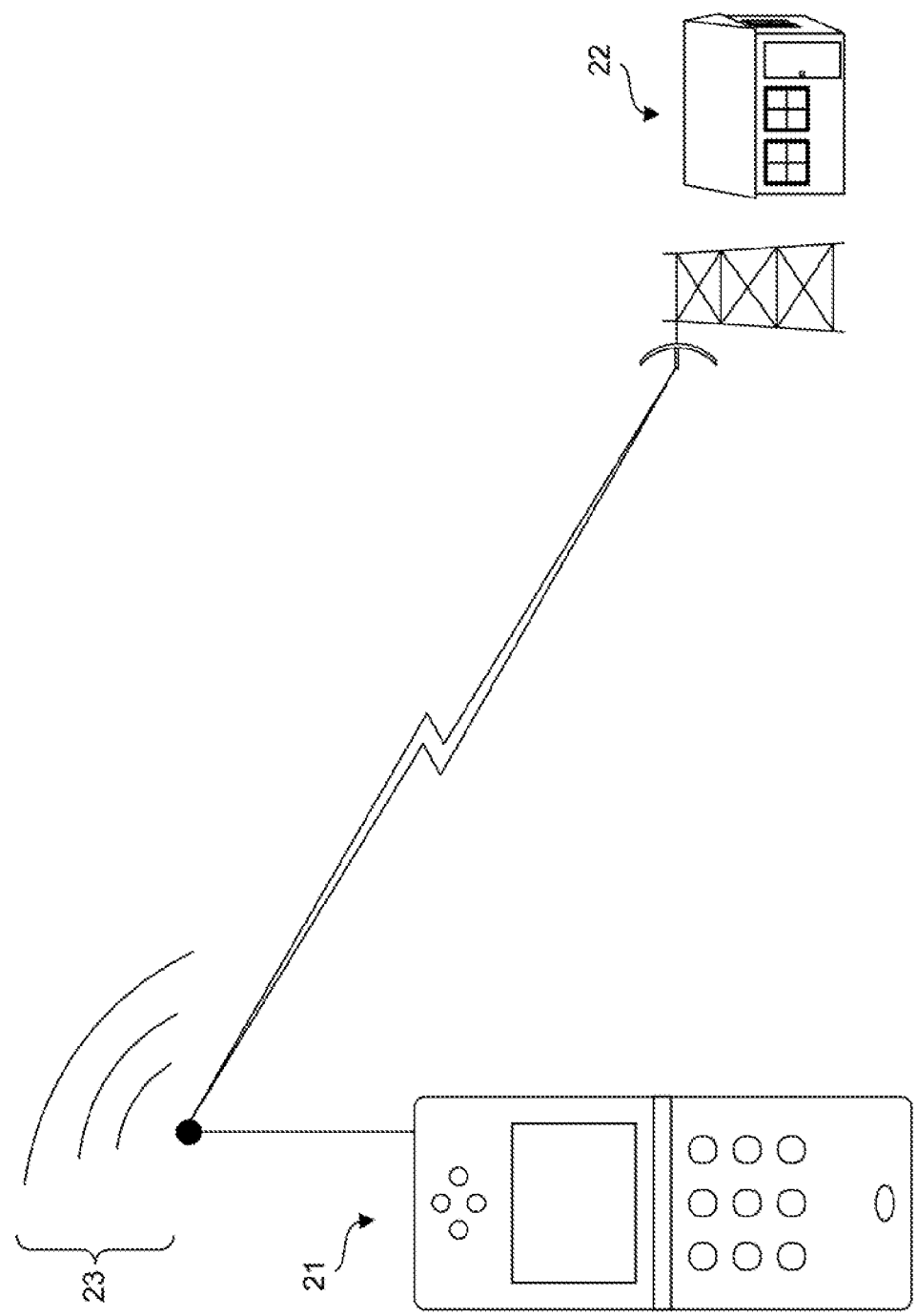
FIG. 2 is a functional block diagram showing service provision through excess transmission capacity for use in the system of FIG. 1.

FIG. 2 is a functional block diagram showing service provision 20 through excess transmission capacity 23 for use in the system 10 of FIG. 1. A device 21 offers excess transmission capacity 23 to a requesting party 22. Excess transmission capacity 23 includes the capability to receive data into or send data from the device using excess, unused transmission bandwidth. For example, excess transmission capacity 23 could be used to send advertising, unsolicited commercial, private or governmental information, public safety and public information data and announcements, to subscribers or to retrieve, with proper authorization, data generated by the device, such as battery depletion and recycling patterns, periods of standby and shutdown, non-private user information, private user information (with permission), or data generated by the processing or sensory functions of the device. Other uses of excess transmission capacity 23 are possible, as would be appreciated by one skilled in the art.

To minimize interference with the performance of the primary service function of the device, excess transmission capacity 23 is typically only made available during periods of non-use or inactivity, that is, idle time, although excess transmission capacity 23 could also be provided concurrently to the primary service function where the user accepted any interference or where technologies permitted the availability of excess transmission capacity simultaneously with the primary service function without interference. Only the requesting party 22 and user of the device 21 need be aware of the service provision 20 through excess transmission capacity 23.

Service Provision Through Excess Processing Capacity

Figure 3:
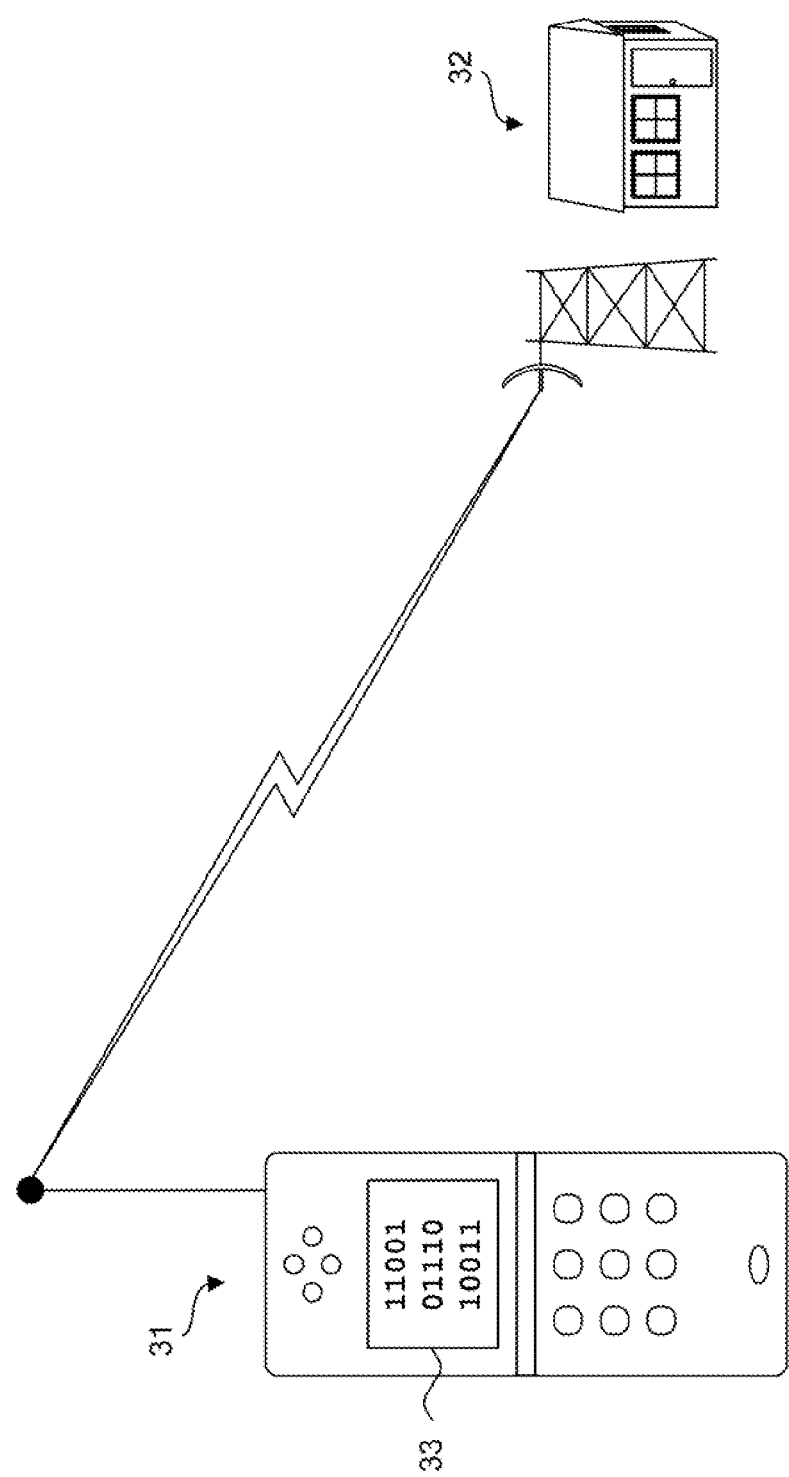
FIG. 3 is a functional block diagram showing service provision through excess processing capacity for use in the system of FIG. 1.

FIG. 3 is a functional block diagram showing service provision 30 through excess processing capacity 33 for use in the system 10 of FIG. 1. A device 31 offers excess processing capacity 33 to a requesting party 32. Excess processing capacity 33 includes providing data processing using the computational and memory storage resources of the device 31. For example, excess processing capacity 33 could be used to execute a program or request on behalf of the requesting party 32 or other third party and, when coupled with excess transmission capacity 23, send a result to the requesting party 32 upon completion of the program or request. Such excess processing capacity could be used independent of other devices or in conjunction with one or more devices to perform the desired processing function. Examples of the use of such excess processing capacity include processing data to facilitate further transmission by one or more devices, processing made available to facilitate distributed computing, and processing to combine or modify data to integrate data from a number of other devices. Other uses of excess processing capacity 33 are possible, as would be appreciated by one skilled in the art.

To minimize interference with the performance of the primary service function of the device, excess processing capacity 33 is typically only made available during periods of non-use or inactivity, that is, idle time, although excess processing capacity 33 could also be provided concurrently to the primary service function. Only the requesting party 22 and user of the device 31 need be aware of the service provision 30 through excess processing capacity 33.

Service Provision Through Add-on Capacity

Figure 4:
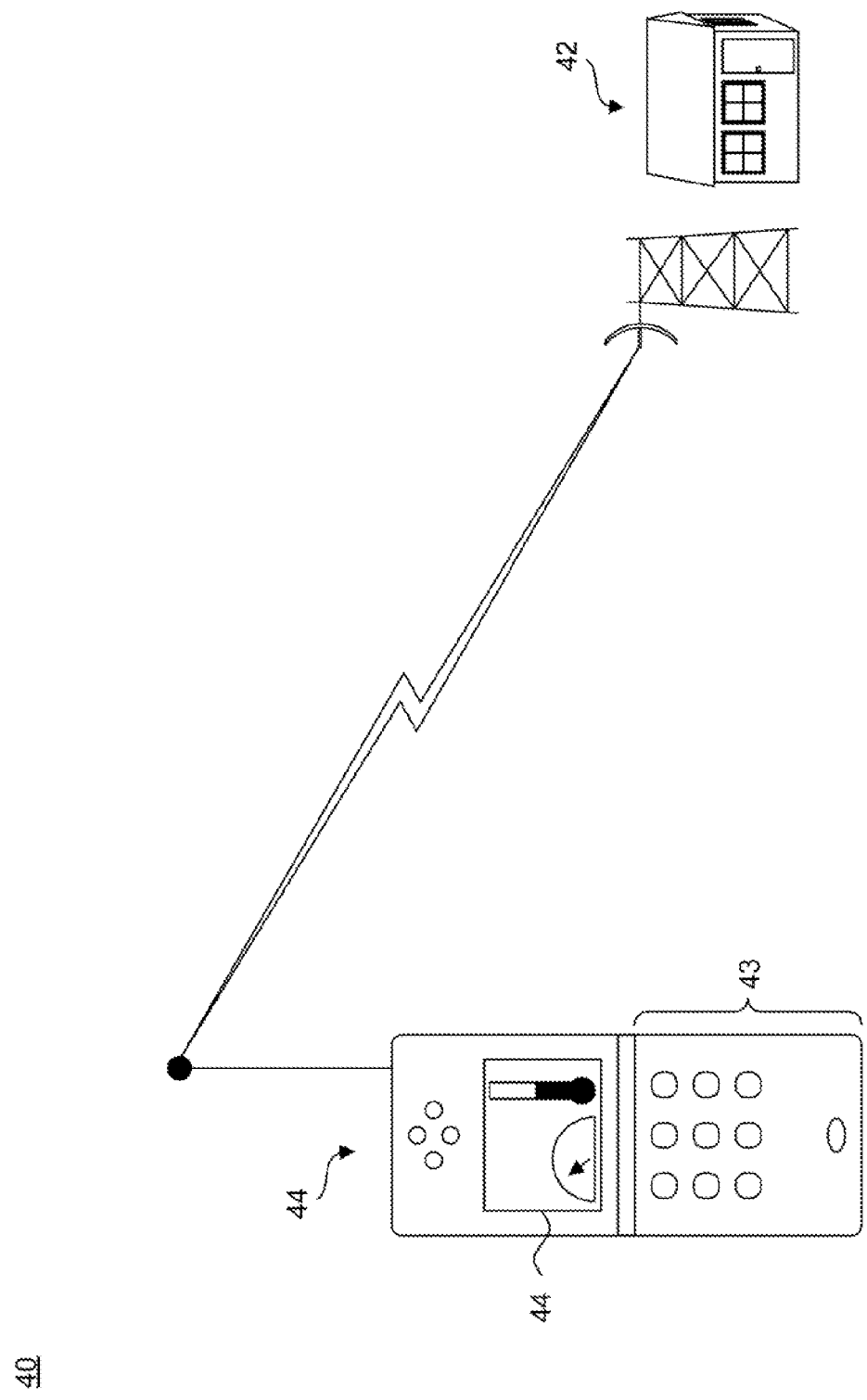
FIG. 4 is a functional block diagram showing service provision through add-on capacity for use in the system of FIG. 1.

FIG. 4 is a functional block diagram showing service provision 40 through add-on capacity 43 for use in the system 10 of FIG. 1. A device 41 offers an add-on capacity 43 to a requesting party 42. The add-on capacity 43 includes providing some form of additional functionality or capacity extrinsic to the device 41 or primary functioning or primary functioning capacity. For example, an add-on component 43, in the form of hardware, software, firmware or data could be installed onto the device 41 to provide new or improved device features, such as a set of weather sensors to detect ambient temperature and barometric pressure, other environmental sensors, sensors to detect noxious or dangerous chemicals or biological agents, sensors to detect electromagnetic or nuclear radiation, sensors to detect physical or biological characteristics of the device user or other individuals, animals or plants, sensors to detect sound, sensors to detect proximity to RFID tags or other devices and other sensing capability. The add-component could also provide other additional capabilities to the device, such as additional processing or transmission capability, or additional data features to enhance the usefulness of the excess capacity for parties other than the user. Optionally, the add-on component 43 could, but need not, include a consumer interface 44 through which to access or control the add-on component 43. Other types and uses of add-on capacity 43 are possible, as would be appreciated by one skilled in the art.

The add-on capacity 43 functions as an adjunct to the primary service function of the device and can be made available both during periods of non-use or inactivity, that is, idle time, or concurrently to the primary service function. The add-on capacity may, but does not need to, enhance the primary service function of the device to the benefit of the user. Only the requesting party 22 and user of the device 41 need be aware of the service provision 40 through add-on capacity 43.

Service Provision Through Signal Propagation Capacity

Figure 5:
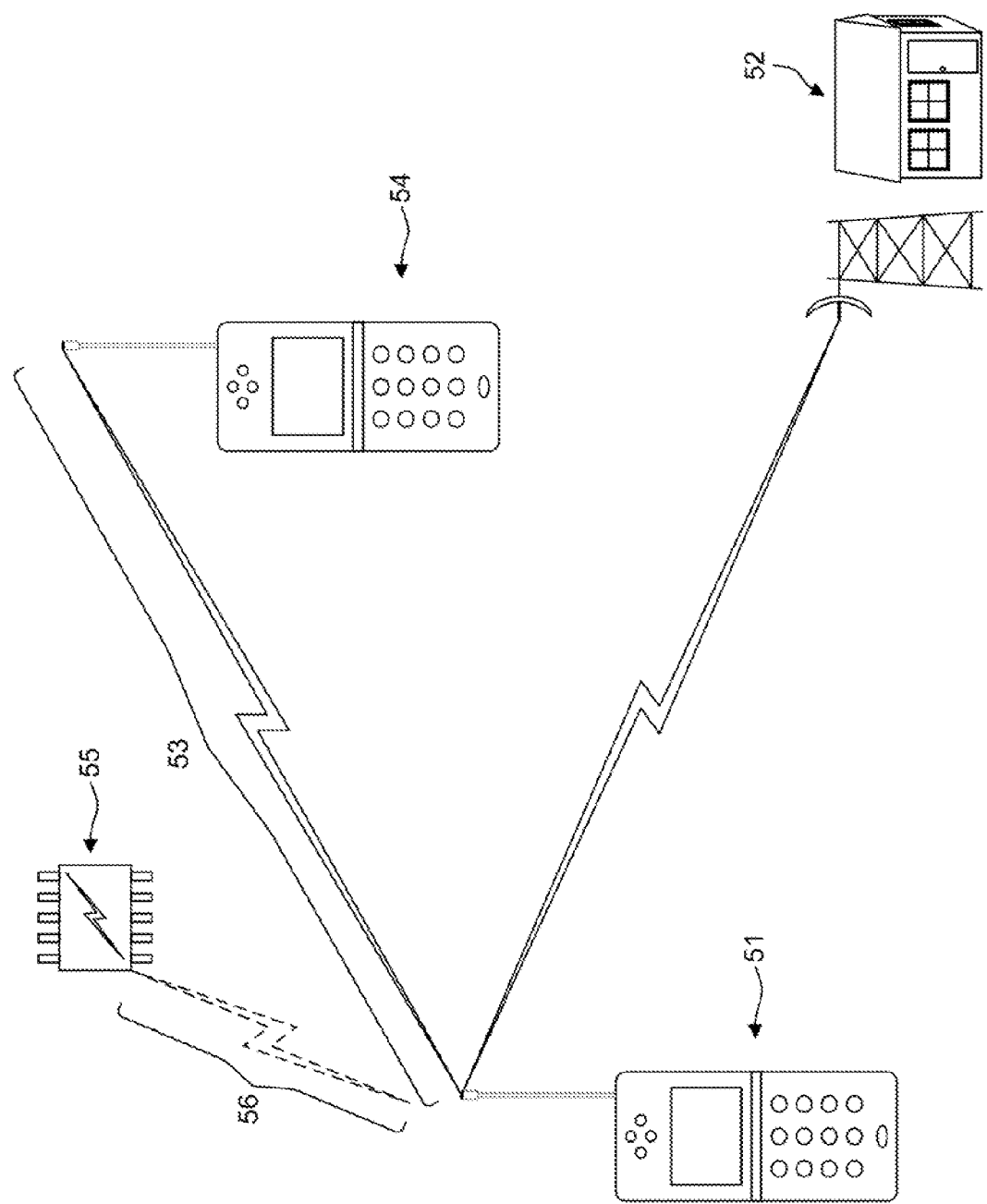
FIG. 5 is a functional block diagram showing service provision through signal propagation capacity for use in the system of FIG. 1.

FIG. 5 is a functional block diagram showing service provision 50 through signal propagation capacity 53 for use in the system 10 of FIG. 1. In one embodiment, a device 51 relays signals being sent to another device 54 or received from another device 54 for a requesting party 52. Signal propagation capacity 53 includes amplifying and repeating a signal as an transceiver intermediate to an on-going communications dialogue. For example, signal propagation capacity 53 could be used to relay a line-of-sight signal into a "dead" zone, such as a building, where access to the service network 11 would otherwise be unavailable. In a further embodiment, a device 51 relays signals being sent to an external device 55 or received from an external device 55 for a requesting party 52. For example, signal propagation capacity 56 could be used to relay data to or from active RFID tags. Other types of signal propagation capacities include the propagation of signals from low power devices or remote devices to make such signals capable of reaching the intended device, network or user, signal propagation to reduce the transmission burden on existing signal transmission infrastructure, and signal propagation to permit the design and operation of networks that can rely wholly or partly on such device-based signal propagation for the transmission function of such network. Other uses of signal propagation capacity 53 are possible, as would be appreciated by one skilled in the art.

To minimize interference with the performance of the primary service function of the device, signal propagation capacity 53 is typically only made available during periods of non-use or inactivity, that is, idle time, although signal propagation capacity 53 could also be provided concurrently to the primary service function. Only the requesting party 22 and user of the device 52 need be aware of the service provision 50 through signal propagation capacity 53.

Compensation Flow State Diagram

Figure 6:
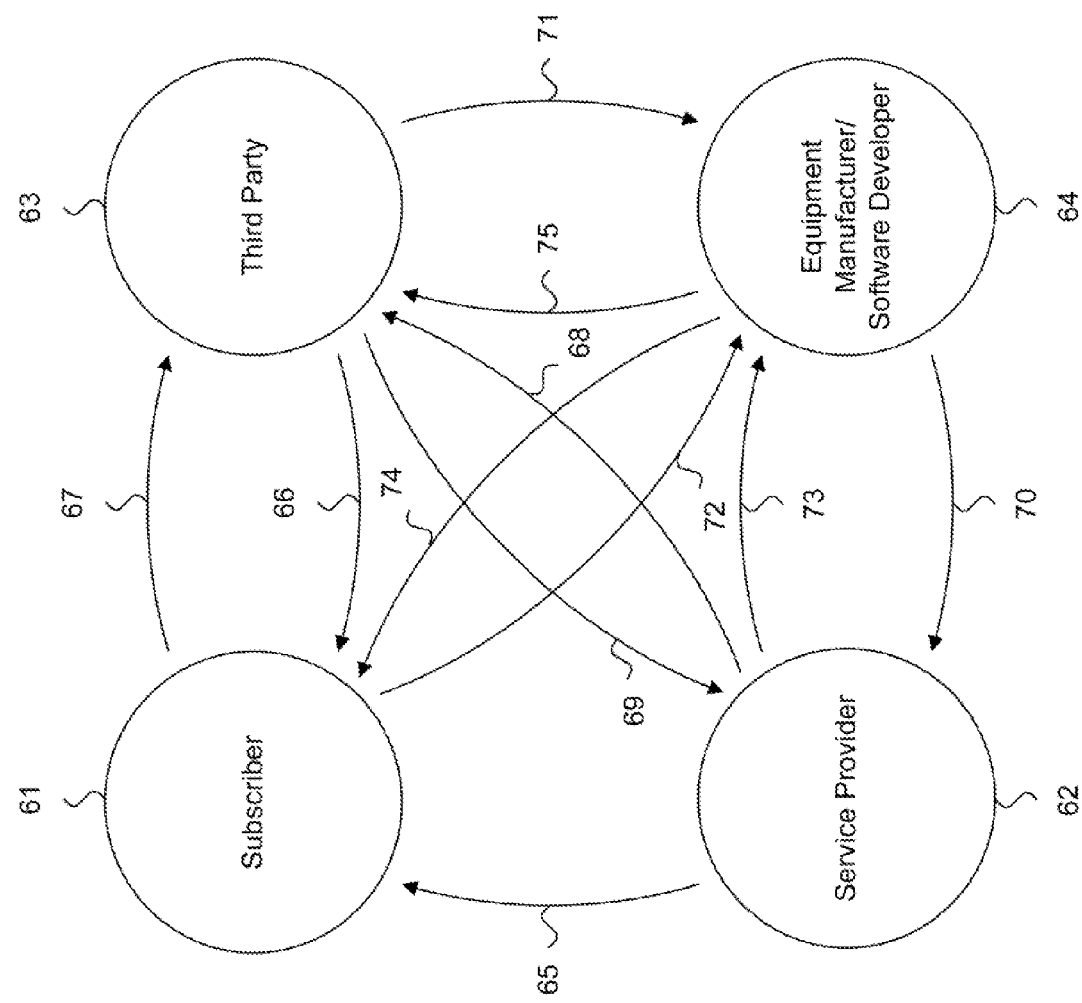
FIG. 6 is a state diagram showing compensation flow between participants in a compensated service network arrangement.

FIG. 6 is a state diagram showing compensation flow 60 between participants in a compensated service network arrangement. By way of example, the participants include a subscriber 61, service provider 62, third party 63, and equipment manufacturer or software developer 64. Service providers 62 include network service providers that offer the actual underlying network service, such as cellular telephone or wireless network service, as well as service-over-network or product-over-network providers, such as on-line music download stores and on-line retailers. Other types of service providers are possible, as would be appreciated by one skilled in the art.

The subscriber 61 receives access to the service network 11 for a device through the service provider 62 under a network service subscription or similar contractual arrangement, such as a prepaid calling plan or other agreement. The third party 63 is a participant that is not party to the network service subscription arrangement between the subscriber 61 and service provider 62. The equipment manufacturer or software developer 64 respectively manufacture equipment or develop software, including add-on components 43, that provide additions or modifications to the device. Other types and numbers of participants, including service providers, are possible, as would be appreciated by one skilled in the art.

In some cases, the service provider 62 is responsible for identifying those subscribers 61 that are capable of performing an ancillary function for one or more of the participants. Third parties 63 and equipment manufacturers and software developers 64 may also work with service providers 62 to identify capable or interested subscribers 61 or to develop add-on components that, when provided to subscribers 61, would make their devices capable of performing ancillary functions. Such add-on capabilities may also, however, be offered directly to subscribers 61 by third parties 63, including service providers other than the primary service provider, or equipment manufacturers or software developers 64 without direct coordination with service providers 62. For example, an equipment manufacturer or software developer 64 may offer directly to subscribers 61 without direct coordination with service provider 62 additional capability to all users of a certain type of phone or other device or software, where such devices are compatible with service offerings of multiple service providers 62 and the users of those devices are subscribers 61 of different service providers 62.

In the context where a service provider 62 initiates the identification of subscribers 61 that are capable of performing an ancillary function, once identified, the service provider 62 selects a suitable scheme to compensate each subscriber 61, as well as possibly other participants, including the third party 63 and equipment manufacturer or software developer 64, based on a several separate or combined bases, including overall time of access, number of access events, data or bandwidth volume accessed, other access or capacity charges, measures, time or length of transmission, and similar factors, such as relating to costs incurred or benefits received. Alternatively, a third party 63 or equipment manufacturer or software developer 64 might directly identify and contact subscribers 61 that are capable of performing an ancillary function without the involvement of the service provider 62 and could select a suitable compensation scheme to only compensate the subscriber 61. In that situation, the service provider 62 would still receive an indirect benefit through increased service usage, such as increase cellular telephone or network usage.

Regardless of which party initiates a program, multiple service providers 62 may establish common, compatible, complimentary or inter-operable programs or offerings to permit subscribers 61 using various devices and subscribers 61 receiving primary service from various service providers 62 to participate in such programs. A particular program may be initiated by one or more participants. For example, a third party 63 may offer additional service or equipment benefits to a subscriber 61 in return for the subscriber's cooperation in providing access to the subscriber's device even without the service provider's knowledge or participation. For example, a subscriber 61 could enter into an agreement with a service provider 62 pursuant to which the subscriber 61 has access to unlimited service in the form of time of access, amount of data or other measures for a fixed periodic fee and in return for the subscriber's cooperation in providing access to the subscriber's device.

The compensation flow 60 is based upon the receipt of compensation, which inures as a benefit to a participant. Accordingly, the benefits are assigned to the participants as follows:

Benefits Inuring to Subscriber
  (1) Service provider-provided benefits 65:
  (a) Direct payments.
  (b) Direct credits, which can be applied against subscriber charges.
  (c) Services provided by service provider or other service providers or third parties.
  (d) Indirect credits, based on payments made by third party to service provider on behalf of subscriber 69.
  (e) Indirect credits, based on payments made by equipment manufacturer or software developer on behalf of subscriber 70.
  (f) Equipment or software purchased by service provider from equipment manufacturer or software developer and provided for a reduced charge or at no charge to subscribers.
  (2) Third party-provided benefits 66:
  (a) Direct payments based on time, data, instances of access, and similar factors.
  (b) Indirect payments made to or through service provider for the benefit of the subscriber.
  (c) Indirect payments made by third parties to equipment manufacturers or software developers to fund the development, manufacturing or availability of equipment or software that is made available to subscribers directly or indirectly through service providers at reduced or no cost to subscribers.
  (d) Services and add-on services provided by third party or other service providers or other third parties (but are funded by third parties).
  (e) Equipment or software purchased by third party from equipment manufacturer or software developer and provided for a reduced charge or at no charge to subscribers.
  (3) Equipment manufacturer or software developer-provided benefits 74:
  (a) Direct payments.
  (b) Services provided by equipment manufacturer or software developer, or service providers or other third parties funded or otherwise arranged by equipment manufacturers or software developers.
  (c) Hardware or software component upgrades and other add-on functionality or modification in exchange for agreement to carry hardware or software on a subscriber's device.

In addition, each subscriber 61 receives the economic benefit of "free" network service access, or access at nominal additional cost, in exchange for supporting third party functions.

Benefits Inuring to Third Party
  (1) Subscriber-provided benefits 67:
  (a) Access to devices for certain governmental, commercial, or private functions, such as compelled for legitimate governmental or regulatory use, such as placing a sensor grid to detect dangerous chemicals, biological agents for police and other public safety purposes, or such as access to sensor, processing, transmission or other capabilities for commercial or governmental purposes. For example, governmental or commercial environmental modeling, biological modeling for epidemiological research and studies, monitoring of electromagnetic radiation from devices or other sources for network maintenance and other purposes, such as collection of data from RFID tags, and so forth.

(2) Service provider-provided benefits 68:

(a) Direct payments directed to funding the development of new hardware or software and corresponding new services that the service provider might offer, such as weather services, emergency, and other notification services, commercial messaging, other subscriber requested or tailored content services, and so forth.

(b) Direct payments based on volume or other service measure that reflects the increased service provider revenue volume generated by any service indirectly attributable to the third party. Thus, the service provider could minimize economic risk and only make direct payments to the third party based on actual increased revenue from as realized from increased service volume.

(c) Services in recognition of a benefit received by the service provider, such as increased user volume, additional fees paid to service provider by equipment manufacturer or software developer, and similar benefits.

(3) Equipment manufacturer/software developer-provided benefits 75:

(a) Direct payments directed to funding development and implementation of third party programs that create additional demand for equipment manufacturer or software developer products or services.

In addition, the third party 63 receives the economic benefit of costs avoided to build out a network of sensors, repeaters or other functionality through the use of existing, in-place devices, which are controlled by the subscribers 61. In a sense, this benefit is provided by those subscribers 61 who agree to grant access to their devices.

Benefits Inuring to Service Provider (1) Third party-provided benefits 69:

(a) Direct payments for participation in service program to enable the third party to access subscriber devices.

(b) Services provided to service provider for their own use for use in providing services to subscribers or to be re-transferred to subscribers in recognition of benefit received by access to the service network.

(c) Equipment or software provided to service provider for their own use for use in providing services to subscribers or to be re-transferred to subscribers in recognition of benefit received by access to the service network.

(2) Equipment manufacturer or software developer-provided benefits 70:

(a) Direct payments for service provider promotion, offering, sale, or program development and initiation involving equipment manufacturer or software developer products.

(b) Equipment or software provided to service provider for their own use, for use in providing services to subscribers or to be re-transferred to subscribers in recognition of benefit received by use of products and services by third party.

In addition, the service provider 62 receives the economic benefit of increased service volume and bandwidth usage, as well as increased subscriber fees generated by subscriber use of related services. A service provider that works with a third party or equipment manufacturer or software provider to provide an exclusive or proprietary service may also achieve increased market share through differentiation of its service from that offered by other service providers. A service provider may also receive payments or the benefits of access from other service providers where a program involves multiple service providers.

Benefits Inuring to Equipment Manufacturer or Software Developer (1) Third party-provided benefits 71:

(a) Receipts generated by sale or lease of equipment or sale, lease or licensing of software to third party or to subscribers or service providers that want to participate in third party program.

(b) Direct payments or funding for the development of products or services that are complementary to those products or services produced or manufactured by others or are needed to establish third party program, for example individual sensor networks, programs and other functionality.

(c) Direct and indirect assistance in product or software development or in establishing standards and specifications associated with third party programs that benefits the third party or the equipment manufacturer or software developer by reducing development and program costs.

(d) Direct or indirect benefits associated with the market demand for equipment manufacturer and software developer products resulting from their compatibility or use with various subscriber services or equipment or software (2) Subscriber-provided benefits 72:

(a) Receipts generated by sale or lease of equipment or software.

(3) Service provider-provided benefits 73:

(a) Receipts generated by sale or lease of equipment or lease or licensing of software.

In addition, the equipment manufacturer or software developer 64 receives the economic benefit from an expanded market for their products and services.

Obligations of Participants

The compensation flow 60 is premised upon the receipt of benefits by the participants, which assign reciprocal obligations upon the participants conveying such benefits. The fulfillment of the obligations is dependent upon the nature of the benefit received and other consideration. Payments, for example, may be calculated through a variety of methods, including on a per-call basis, based on volume of calls, based on a base access or capacity charge, based on time of processing or transmission or upon a combination of these and other similar methods.

The obligations are assigned to the participants as follows:

Obligations Assigned to Subscriber

Each subscriber 61 is a direct beneficiary of the compensation structure and is obligated to provide the required access to the device to receive the corresponding benefits. The subscriber 61 may choose to pay more for a device that has greater capability in terms of processing, transmission or similar capability to then be able to make such greater capability available to other participants and derive additional benefits as a result. In addition, the subscriber may be required, as a condition of the receipt of benefits to engage in certain activities. For example, a subscriber may be required to leave on their device during a certain period, or may be required to initiate a periodic processing or transmission activity. In addition, a subscriber may be required to permit certain information regarding usage to be recorded, used, analyzed, or transferred as a condition of receipt of benefits. These requirements may include, for example, recording location information, usage patterns information, and other information. Other obligations, either explicit or implicit, are possible, as would be appreciated by one skilled in the art.

Obligations Assigned to Third Party

The third party 63 is obligated to make payments to service providers or subscribers to promote a third party program or to cause participants to carry a signal or permit devices to support third party programs, including add-on functionality, use of processing, transmission or signal propagation capability, on behalf of the third party. The third party may also be required to fund, in whole or part, the development of required equipment or software, or the acquisition of such equipment or software by device manufacturers or service providers to incentivize the parties to carry the add-on capability needed to support the third party program. Other obligations, either explicit or implicit, are possible, as would be appreciated by one skilled in the art.

Obligations Assigned to Service Provider

The service provider 62 is obligated to account to the various participants for the portions of fees that are payable through the service provider 62. For example, if a credit was to be applied to a subscriber bill based on the receipt of funds by the service provider 62 from a third party 63, the service provider 62 is obligated to provide an accounting for that payment. The service provider may be obligated to fund, in whole or part, the development of equipment or software to support the availability of add-on capability to devices used by subscribers. The service provider may be obligated to fund development or implementation of third party programs, for example, where the service provider has identified an advantage. For example, a service provider may be advantaged through service differentiation with competitors, increased market share, and so forth, by supporting the third party programs. Other obligations, either explicit or implicit, are possible, as would be appreciated by one skilled in the art.

Obligations Assigned to Equipment Manufacturer or Software Developer

The equipment manufacturer or software developer 64 may be obligated to make payments to subscribers 61 to incentivize the subscribers 61 to carry the hardware or software on their devices. The equipment manufacturer or software developer 64 is also obligated to subsidize the development and production costs of hardware or software that is made available without charge, or at a discount, to the subscribers 61. The equipment manufacturer or software developer may be obligated to make payments to third party to support third party program development, where the equipment manufacturer or software developer has determined that such third party program will help to create demand for equipment manufacturer or software developer products. Other obligations, either explicit or implicit, are possible, as would be appreciated by one skilled in the art.

While the invention has been particularly shown and described as referenced to the embodiments thereof, those skilled in the art would understand that the foregoing and other changes in form and detail may be made therein without departing from the spirit and scope of the invention.

What is claimed is:

1. A computer-implemented method for compensating ancillary use of a wireless service device for excess transmission bandwidth, comprising:
    discovering a multiplicity of wireless service devices, which are each interoperable on a wireless service network operated by a service provider;
    for each wireless service device, determining a primary function performable by a subscriber through the wireless service network and an ancillary function performable by a third party through the wireless service network based on availability of capacity for excess transmission bandwidth;
    identifying each of the wireless service devices comprising an available capacity to perform the ancillary function over the service network;
    performing the ancillary function over the excess transmission bandwidth using at least one of the identified wireless service devices through the combination, modification and integration of data from the two or more other such identified wireless service devices; and
    compensating participants of the ancillary function in exchange for the performance of the ancillary function, comprising:
        identifying and awarding benefits inuring to the subscriber in addition to economic benefit of enhanced network service access;
        identifying and awarding benefits inuring to the service provider in addition to economic benefit of increased service volume and bandwidth usage and increased subscriber fees generated by subscriber use of related services; and
        identifying and awarding benefits inuring to the third party in addition to economic benefit of costs avoided to build out a network of sensors, repeaters or other functionality through the use of existing, in-place devices, which are controlled by the subscribers.

2. A method according to claim 1, further comprising:
    providing the benefits inuring to the subscriber from the service provider comprising at least one of direct payments, direct credits that can be applied against subscriber charge, services provided by the service provider, indirect credits based on payments made by the third party to the service provider on behalf of the subscriber.

3. A method according to claim 1, further comprising:
    providing the benefits inuring to the subscriber from the third party comprising at least one of direct payments based on time, data, instances of access, and similar factors, indirect payments made to or through the service provider for the benefit of the subscriber, and services and add-on services provided by the third party.

4. A method according to claim 1, further comprising:
    providing the benefits inuring to the service provider from the third party comprising at least one of direct payments for participation in a service program to enable the third party to access subscriber devices, services provided to the service provider for their own use for use in providing services to the subscriber or to be re-transferred to the subscriber in recognition of benefit received by access to the service network, and equipment or software provided to the service provider for their own use for use in providing services to the subscriber or to be re-transferred to the subscriber in recognition of benefit received by access to the service network.

5. A method according to claim 1, further comprising:
    providing the benefits inuring to the third party from the subscriber comprising access to devices for certain governmental, commercial, or private functions.

6. A method according to claim 1, further comprising:
    providing the benefits inuring to the service provider from the service provider comprising at least one of direct payments directed to funding the development of new hardware or software and corresponding new services that the service provider might offer, direct payments based on volume or other service measure that reflects the increased service provider revenue volume generated by any service indirectly attributable to the third party, and services in recognition of a benefit received by the service provider.

7. A computer-implemented method for compensating ancillary use of a wireless service device for excess processing capacity, comprising:

discovering a multiplicity of wireless service devices, which are each interoperable on a wireless service network operated by a service provider;

for each wireless service device, determining a primary function performable by a subscriber through the wireless service network and an ancillary function performable by a third party through the wireless service network based on availability of capacity for excess processing capacity;

identifying each of the wireless service devices comprising an available capacity to perform the ancillary function over the service network;

performing the ancillary function through the excess processing capacity using at least one of the identified wireless service devices through the combination, modification and integration of data from the two or more other such identified wireless service devices; and compensating participants of the ancillary function in exchange for the performance of the ancillary function, comprising:
  identifying and awarding benefits inuring to the subscriber in addition to economic benefit of enhanced network service access;
  identifying and awarding benefits inuring to the service provider in addition to economic benefit of increased service volume and bandwidth usage and increased subscriber fees generated by subscriber use of related services; and
  identifying and awarding benefits inuring to the third party in addition to economic benefit of costs avoided to build out a network of sensors, repeaters or other functionality through the use of existing, in-place devices, which are controlled by the subscribers.

8. A method according to claim 7, further comprising:
providing the benefits inuring to the subscriber from the service provider comprising at least one of direct payments, direct credits that can be applied against subscriber charge, services provided by the service provider, indirect credits based on payments made by the third party to the service provider on behalf of the subscriber.

9. A method according to claim 7, further comprising:
providing the benefits inuring to the subscriber from the third party comprising at least one of direct payments based on time, data, instances of access, and similar factors, indirect payments made to or through the service provider for the benefit of the subscriber, and services and add-on services provided by the third party.

10. A method according to claim 7, further comprising:
providing the benefits inuring to the service provider from the third party comprising at least one of direct payments for participation in a service program to enable the third party to access subscriber devices, services provided to the service provider for their own use for use in providing services to the subscriber or to be re-transferred to the subscriber in recognition of benefit received by access to the service network, and equipment or software provided to the service provider for their own use for use in providing services to the subscriber or to be re-transferred to the subscriber in recognition of benefit received by access to the service network.

11. A method according to claim 7, further comprising:
providing the benefits inuring to the third party from the subscriber comprising access to devices for certain governmental, commercial, or private functions.

12. A method according to claim 7, further comprising:
providing the benefits inuring to the service provider from the service provider comprising at least one of direct payments directed to funding the development of new hardware or software and corresponding new services that the service provider might offer, direct payments based on volume or other service measure that reflects the increased service provider revenue volume generated by any service indirectly attributable to the third party, and services in recognition of a benefit received by the service provider.

13. A computer-implemented method for compensating ancillary use of a wireless service device with add-on functional capacity, comprising:
  discovering a multiplicity of wireless service devices, which are each interoperable on a wireless service network operated by a service provider;
  for each wireless service device, determining a primary function performable by a subscriber through the wireless service network and an ancillary function performable by a third party through the wireless service network based on availability of capacity for add-on functional capacity;
  identifying each of the wireless service devices comprising an available capacity to perform the ancillary function over the service network;
  augmenting at least one of the identified wireless service devices with the add-on functional capacity provided by a source of add-on functional capacity comprising one of an equipment manufacturer and a software developer;
  performing the ancillary function through the add-on functional capacity using at least one of the identified wireless service devices through the combination, modification and integration of data from the two or more other such identified wireless service devices; and
  compensating participants of the ancillary function in exchange for the performance of the ancillary function, comprising:
    identifying and awarding benefits inuring to the subscriber in addition to economic benefit of enhanced network service access;
    identifying and awarding benefits inuring to the service provider in addition to economic benefit of increased service volume and bandwidth usage and increased subscriber fees generated by subscriber use of related services;
    identifying and awarding benefits inuring to the third party in addition to economic benefit of costs avoided to build out a network of sensors, repeaters or other functionality through the use of existing, in-place devices, which are controlled by the subscribers; and
    identifying and awarding benefits inuring to the add-on functional capacity source in addition to economic benefit from an expanded market for their products and services.

14. A method according to claim 13, further comprising:
providing the benefits inuring to the subscriber from the service provider comprising at least one of direct payments, direct credits that can be applied against subscriber charge, services provided by the service provider, indirect credits based on payments made by the third party to the service provider on behalf of the subscriber.

15. A method according to claim 13, further comprising:
providing the benefits inuring to the subscriber from the third party comprising at least one of direct payments based on time, data, instances of access, and similar factors, indirect payments made to or through the service provider for the benefit of the subscriber, and services and add-on services provided by the third party.

16. A method according to claim 13, further comprising: providing the benefits inuring to the service provider from the third party comprising at least one of direct payments for participation in a service program to enable the third party to access subscriber devices, services provided to the service provider for their own use for use in providing services to the subscriber or to be re-transferred to the subscriber in recognition of benefit received by access to the service network, and equipment or software provided to the service provider for their own use for use in providing services to the subscriber or to be re-transferred to the subscriber in recognition of benefit received by access to the service network.

17. A method according to claim 13, further comprising: providing the benefits inuring to the third party from the subscriber comprising access to devices for certain governmental, commercial, or private functions.

18. A method according to claim 13, further comprising: providing the benefits inuring to the service provider from the service provider comprising at least one of direct payments directed to funding the development of new hardware or software and corresponding new services that the service provider might offer, direct payments based on volume or other service measure that reflects the increased service provider revenue volume generated by any service indirectly attributable to the third party, and services in recognition of a benefit received by the service provider.

19. A method according to claim 13, further comprising: providing the benefits inuring to the add-on functional capacity source from the third party comprising at least one of receipts generated by sale or lease of equipment or sale, lease or licensing of software to the third party or to the subscriber or the service provider that want to participate in a third party program, direct payments or funding for the development of products or services that are complementary to those products or services produced or manufactured by others or are needed to establish the third party program, direct and indirect assistance in product or software development or in establishing standards and specifications associated with third party programs that benefits the third party or the add-on functional capacity source by reducing development and program costs, and direct or indirect benefits associated with the market demand for equipment manufacturer and software developer products resulting from their compatibility or use with various subscriber services or equipment or software.

20. A method according to claim 13, further comprising: providing the benefits inuring to the add-on functional capacity source from the third party comprising receipts generated by sale or lease of equipment or software.

21. A method according to claim 13, further comprising: providing the benefits inuring to the add-on functional capacity source from the service provider comprising receipts generated by sale or lease of equipment or lease or licensing of software.

22. A computer-implemented method for compensating ancillary use of a wireless service device for signal propagation, comprising:
discovering a multiplicity of wireless service devices, which are each interoperable on a wireless service network operated by a service provider;
for each wireless service device, determining a primary function performable by a subscriber through the wireless service network and an ancillary function performable by a third party through the wireless service network based on availability of capacity for signal propagation;
identifying each of the wireless service devices comprising an available capacity to perform the ancillary function over the service network;
performing the ancillary function by propagating a signal using at least one of the identified wireless service devices through the combination, modification and integration of data from the two or more other such identified wireless service devices; and
compensating participants of the ancillary function in exchange for the performance of the ancillary function, comprising:
identifying and awarding benefits inuring to the subscriber in addition to economic benefit of enhanced network service access;
identifying and awarding benefits inuring to the service provider in addition to economic benefit of increased service volume and bandwidth usage and increased subscriber fees generated by subscriber use of related services; and
identifying and awarding benefits inuring to the third party in addition to economic benefit of costs avoided to build out a network of sensors, repeaters or other functionality through the use of existing, in-place devices, which are controlled by the subscribers.

23. A method according to claim 22, further comprising: providing the benefits inuring to the subscriber from the service provider comprising at least one of direct payments, direct credits that can be applied against subscriber charge, services provided by the service provider, indirect credits based on payments made by the third party to the service provider on behalf of the subscriber.

24. A method according to claim 22, further comprising: providing the benefits inuring to the subscriber from the third party comprising at least one of direct payments based on time, data, instances of access, and similar factors, indirect payments made to or through the service provider for the benefit of the subscriber, and services and add-on services provided by the third party.

25. A method according to claim 22, further comprising: providing the benefits inuring to the service provider from the third party comprising at least one of direct payments for participation in a service program to enable the third party to access subscriber devices, services provided to the service provider for their own use for use in providing services to the subscriber or to be re-transferred to the subscriber in recognition of benefit received by access to the service network, and equipment or software provided to the service provider for their own use for use in providing services to the subscriber or to be re-transferred to the subscriber in recognition of benefit received by access to the service network.

26. A method according to claim 22, further comprising: providing the benefits inuring to the third party from the subscriber comprising access to devices for certain governmental, commercial, or private functions.

27. A method according to claim 22, further comprising: providing the benefits inuring to the service provider from the service provider comprising at least one of direct payments directed to funding the development of new hardware or software and corresponding new services that the service provider might offer, direct payments based on volume or other service measure that reflects the increased service provider revenue volume generated by any service indirectly attributable to the third party, and services in recognition of a benefit received by the service provider.

* * * * *